United States Patent Office 3,374,396
Patented Mar. 19, 1968

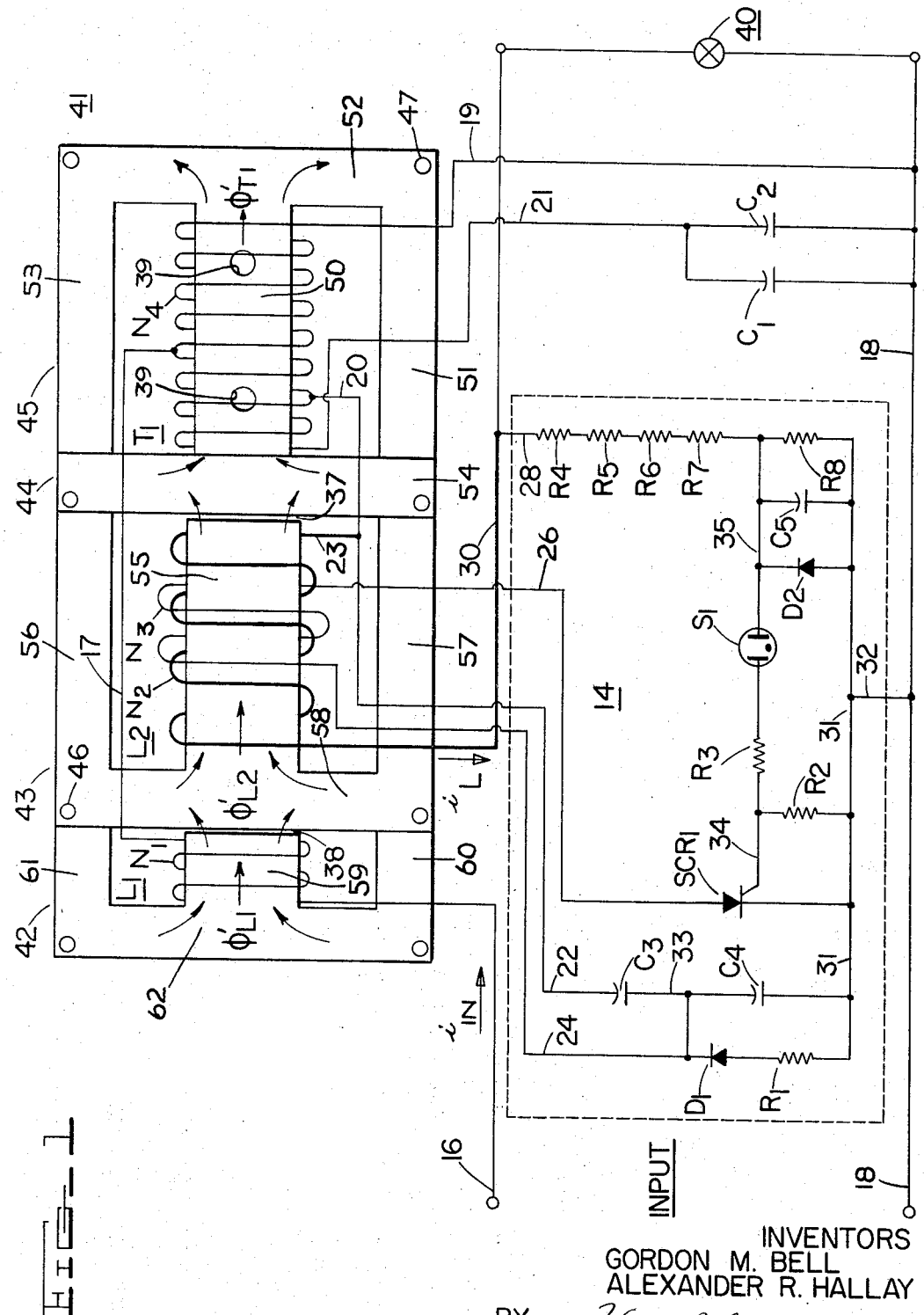

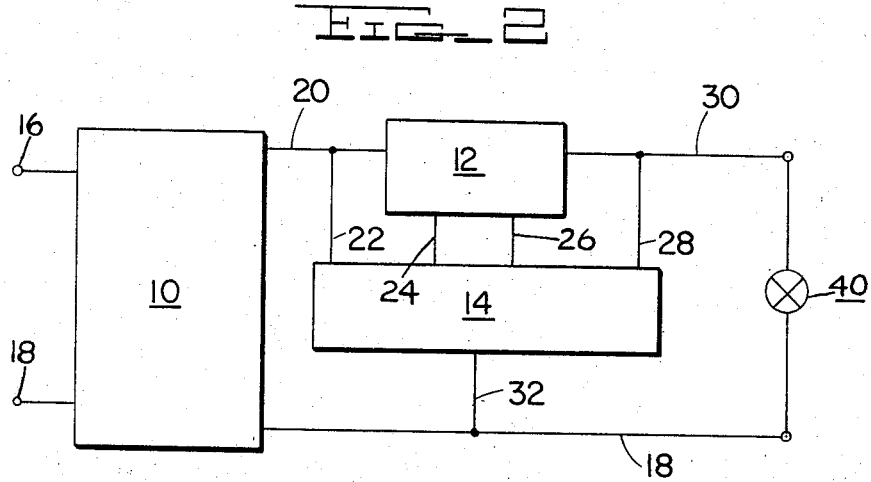
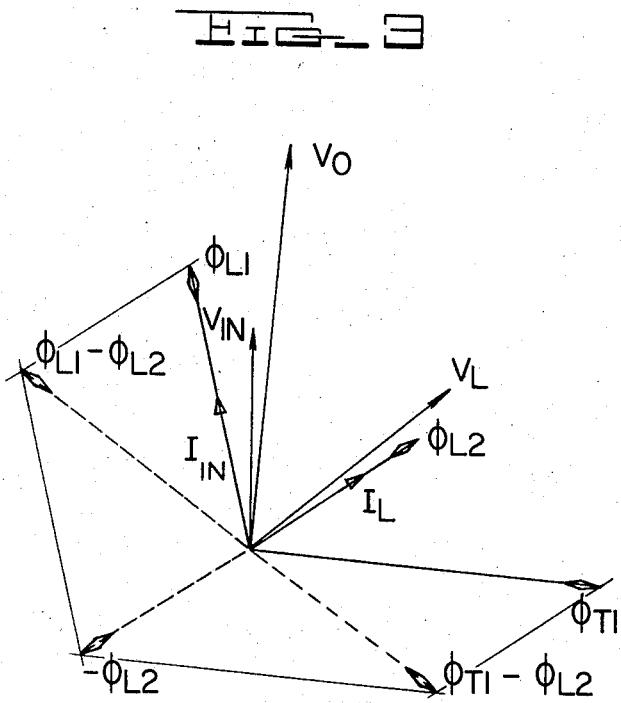

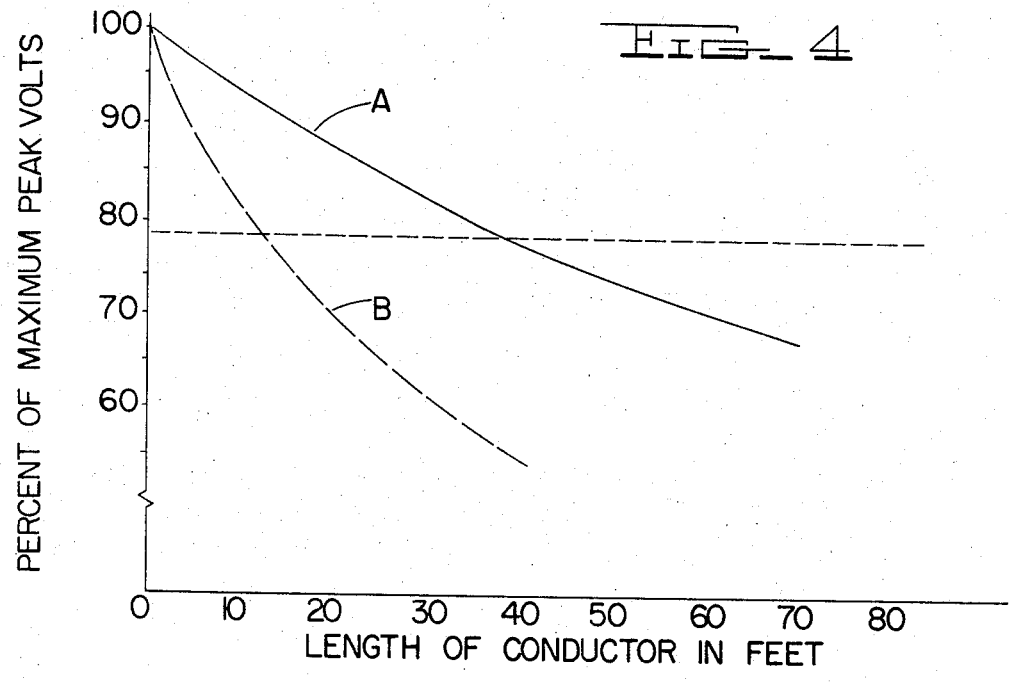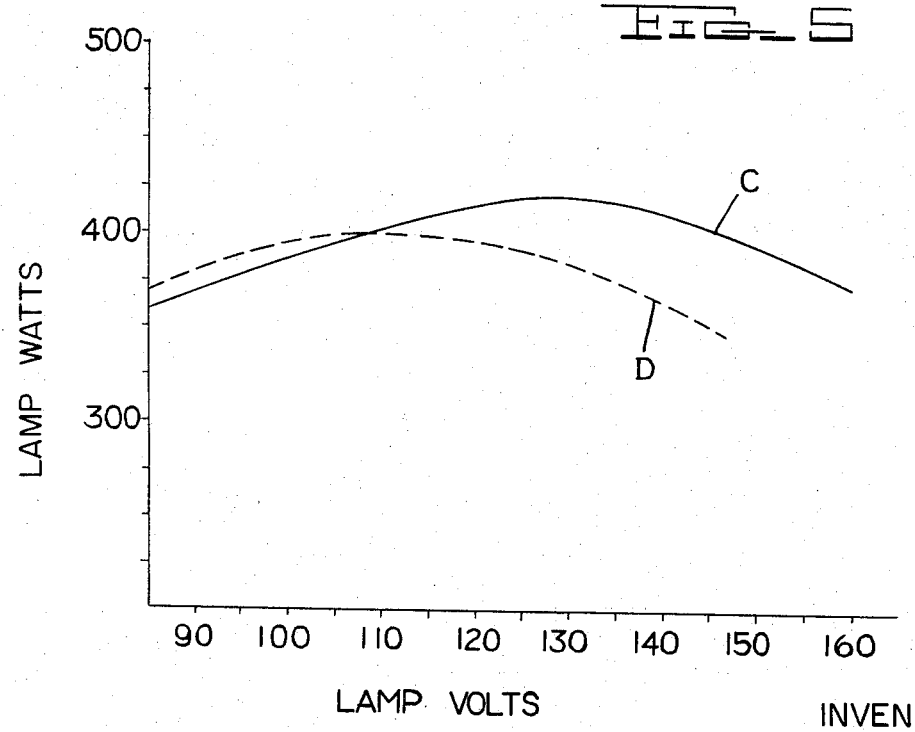

3,374,396
STARTING, CURRENT LIMITING AND VOLTAGE STABILIZING CIRCUIT FOR HIGH INTENSITY ARC DISCHARGE LAMPS
Gordon M. Bell and Alexander R. Hallay, Fort Wayne, Ind., assignors to General Electric Company, a corporation of New York
Filed Jan. 9, 1967, Ser. No. 608,030
11 Claims. (Cl. 315—277)

ABSTRACT OF THE DISCLOSURE

Starting and operating control apparatus including a current limiting reactor, a magnetic voltage stabilizer for supplying a constant voltage to the current limiting reactor and arc discharge lamp, and a starting circuit coupled on the current limiting reactor. The current limiting reactor and magnetic voltage stabilizer share a common section of the laminated core structure of the control apparatus. The magnetic flux produced by the current limiting reactor and magnetic voltage stabilizer are vectorially substractive with respect to each other in the common section of the laminated core and the common section does not become saturated with flux. A voltage divider is connected across the output of the control apparatus and responds to an open circuit voltage condition across the output to cause the starting circuit to supply a starting pulse in every other half cycle of the supply voltage. The starting circuit is essentially inoperative during normal operation of the lamp.

Background of the invention

The present invention relates to control apparatus for starting and operating discharge devices, and more particularly is concerned with control apparatus for high-intensity sodium arc discharge lamps. One example of this type of lamp is the lamp marketed by the General Electric Company under its registered "Lucalox" trademark.

High-intensity sodium lamps exhibit, in addition to a negative resistance operating characteristic, certain starting and operating characteristics that present problems not previously encountered in the ballast industry. For example, control apparatus for the high-intensity sodium lamps must supply a peak starting potential of approximately 2,500 volts at normal ambient temperatures. Mercury vapor lamp control apparatus of the prior art, however, has needed only to supply a peak starting potential of about 270 volts.

When operated from a sixty cycle per second source, control apparatus for high-intensity sodium lamps must supply a "restrike" voltage equal to about 150 percent of the lamp arc drop every half cycle in order to keep the lamps ignited. The arc drop across high-intensity sodium lamps increases as the lamps age, and the control apparatus must compensate for this change. For example, the arc drop of 400 watt high-intensity lamps may change from 85 to 160 volts. The control apparatus must supply over the life of the lamp a current approximately varying from 4.7 to 2.8 amperes to compensate for the arc drop. On the other hand, the normal arc drop of a 400 watt mercury vapor lamp remains fairly constant at about 135 volts and the current supplied to the mercury vapor lamp does not have to be controlled because of a varying arc drop. Further, the power supplied to the high-intensity sodium lamps must be controlled within certain limits for the reason that when the wattage level of the lamps is too high, the lamps may either extinguish or go into a "thermal runaway" condition.

This "thermal runaway" condition also presents a problem to the designer of control apparatus. When the wattage level of high-intensity sodium lamp exceeds a certain limit the operating temperature of the lamp will increase, the lamp arc drop will increase. If the lamp current were to remain constant under these conditions, the power consumed by the lamp would increase and cause a still further increase in the arc drop. If power supplied to the lamp is not controlled, this "thermal runaway" condition continues until the lamp is destroyed. Voltage fluctuations can also cause a "thermal runaway" condition. Therefore, it is desirable, if not necessary, for the control apparatus to supply a substantially constant voltage to the lamp.

In a commercially used control apparatus for high-intensity lamps the starting circuits are operative during the operating condition of the control apparatus. As a result of the continuous starting circuit operation premature failure of starting circuit components has been encountered. Also, due to continuous operation of the starting circuit radio interference has been objectionable in certain applications. It is therefore desirable that the starting circuit come into play only during the starting condition of the control apparatus.

Summary

It is a general object of this invention to provide an improved control apparatus for starting and operating high intensity arc discharge lamps.

It is a more particular object of the invention to provide apparatus which has a relatively low kilovolt ampere rating and economically utilizes magnetic core materials.

Yet another object of this invention is to provide an improved apparatus in which a starting circuit is activated only during starting condition of the control apparatus.

In one form of the invention, we have provided an improved control apparatus for starting and operating one or more electric discharge devices, such as high-intensity sodium lamps, that includes a magnetic voltage stabilizer, a current limiting means such as a reactor, and a starting circuit coupled with the reactor to induce a starting voltage in the winding of the reactor.

In a more specific aspect of the invention, voltage divider means are connected across the output of the control apparatus and render the starting circuit operative during the starting condition of the control apparatus.

Further, we have provided a laminated core arrangement so that the current limiting reactor and magnetic voltage stabilizer share a common yoke section of the core. By this arrangement the magnetic flux produced by the current limiting reactor and magnetic voltage stabilizer are vectorially subtractive with respect to each other in the common section of the core.

The subject matter which is regarded as the present invention is particularly pointed out and distinctly claimed in the concluding portion of the specification. The invention itself, however, both as to its organization and mode of operation, together with other objects and advantages thereof may best be understood by reference to the following description taken in connection with the accompanying drawings in which:

FIGURE 1 is a schematic diagram showing a starting and operating circuit incorporating the invention for a high-intensity sodium electric discharge lamp and includes a top view of the magnetic core structure;

FIGURE 2 is a block diagram showing the relationships between different portions of the circuit of the embodiment of the invention shown in FIGURE 1;

FIGURE 3 is a simplified vector diagram useful in explaining the operation of the magnetic circuits of FIGURE 1;

FIGURE 4 illustrates a curve showing a plot of percent of maximum peak voltage versus length of conductor between the lamp and control apparatus to demonstrate the length of conductor that may be used with the present invention as compared with a prior art phase control apparatus;

FIGURE 5 illustrates a curve showing a plot of lamp watts versus line volts to demonstrate the regulating characteristics of the apparatus of the present invention as compared with prior art apparatus.

Description of the preferred embodiment

Referring now to the embodiment of the invention illustrated in FIGURES 1 and 2, the control apparatus supplies a stabilized operating voltage and limiting operating current to a high-intensity sodium lamp 40. This control apparatus includes a magnetic voltage stabilizer 10 and a current limiting reactor 12 for limiting the amount of current supplied to the lamp through lead 30 during operation. In the illustrated embodiment, a starting voltage is supplied through leads 24 and 26 to the current limiting reactor by a starting circuit 14. Power is supplied to the starting circuit 14 through leads 22 and 32, from the output leads 20 and 18 of the voltage stabilizer. A voltage divider section of the starting circuit is connected by leads 28 and 32 across the output leads 33 and 18 of the control apparatus.

The magnetic voltage stabilizer 10 is comprised of a linear reactor $L_1$, a saturable transformer $T_1$, and capacitors $C_1$, $C_2$. One end of the winding $N_1$ of the reactor $L_1$ is connected through lead 17 to a tap on the winding $N_4$ of saturable transformer $T_1$. The winding $N_1$ of the reactor $L_1$ is wound on the center leg 59 of a core section 42 which forms part of a laminated core assembly denoted generally by the numeral 41. In order to provide the desired impedance in reactor $L_1$, the center leg 59 of core section 42 is preferably shortened so that an air gap 38 is formed between the center leg 59 and the yoke 58 of core section 43.

The winding $N_4$ of saturable transformer $T_1$ is wound on the center leg 50 of a core section 45 and is connected at one end through lead 19 to lead 18. The other end of the winding $N_4$ is connected through lead 21 to capacitors $C_1$ and $C_2$, the other sides of which are connected to lead 18. The saturable transformer $T_1$ is an autotransformer and bridged gaps 39 are provided in the winding leg 50 of the transformer $T_1$. The winding $N_4$ of the saturable transformer $T_1$ is tapped to supply an operating voltage to current limiting reactor $L_2$. In addition, winding $N_4$ is connected through lead 17 to linear reactor $L_1$.

The linear reactor $L_1$ and capacitors $C_1$ and $C_2$ form a circuit tuned to a frequency that is preferably slightly higher than the line frequency. Linear reactor $L_1$ tends to limit line current supplied to the saturable transformer $T_1$ during part of each cycle of supply voltage.

It will be best seen in FIGURE 1 that voltage stabilizer 10 supplies a stabilized voltage to starting circuit 14, the current limiting reactor 12, and lamp 40. A detailed discussion of the theory and mode of operation of magnetic voltage stabilizer that may be used in the practice of the invention, is contained in American Institute of Electrical Engineers, District Conference Paper No. DP 62–613, presented in 1962 by Gordon M. Bell and pages 503–508 of "Magnetic Amplifiers" by H. F. Storm and published by Wiley and Sons in 1955.

As will be seen in FIGURE 1, the current limiting reactor $L_2$ is comprised of a winding $N_2$ wound on the center leg of a core section 43. In order to provide the desired impedance in current limiting reactor $L_2$, the center leg 55 of core section 43 is made shorter than the outer legs 56 and 57 so as to form an air gap 37 between the center leg 55 and core section 44. The winding $N_2$ is connected in series through lead 30 to one side of the lamp 40. In addition to limiting the normal operating current of the lamp 40, the reactor $L_2$ operates as a pulse transformer in conjunction with the starting circuit 14 to produce high voltage pulses for starting the lamp 40. Starting winding $N_3$ is wound on center leg 36 of core section 43 with the winding $N_2$ to magnetically couple the reactor $L_2$ and starting circuit 14. The high voltage pulse needed to start conduction of the lamp 40 is induced in the winding $N_2$ by means of a relatively smaller voltage pulse through winding $N_3$. This high voltage pulse appearing in winding $N_3$ is obtained from the discharge of a capacitor $C_4$ through the winding $N_3$.

In actual practice it has been found to be advantageous to use a single laminated core assembly 41 for linear reactor $L_1$, current limiting reactor $L_2$, and saturable transformer $T_1$. With particular reference to FIGURE 1, it should be noted that core section 42 is constructed of similar E-shaped stampings to form the desired stack height. In like manner a plurality of similar E-stampings having essentially the same stack height form the central laminated core section 43, and a plurality of other similar stampings of approximately the same stack height form core section 45. The core sections 44 and 45 are constructed with groups of two I-shaped stampings alternately interleaved with the E-stampings to minimize the air gap effect of the butt-joints as is well known in the art.

The embodiment of the control apparatus illustrated in FIGURE 1 was constructed and employed to operate 400 watt high-intensity sodium lamps from a 60 cycle per second 120 volt source. The minimum starting voltage for the lamps is 2,500 volts. The nominal operating voltage for a new lamp is 100 volts and the corresponding operating current is about 4.7 amperes. The following specifications of components used are given by way of a specific exemplification of the invention actually reduced to practice and not by way of limitation thereof:

Linear reactor winding $N_1$ --- 140 turns of .04427 inch diameter insulated wire.
Current limiting reactor winding $N_2$ --- 268 turns of .0641 inch diameter insulated wire.
Starting winding $N_3$ --- 15 turns of .0320 inch diameter insulated wire.
Saturable transformer winding $N_4$ --- 352 turns of .0605 inch diameter insulated wire.
Overall length of laminated core 41 --- about 8.3 inches.
Overall width of laminated core 41 --- about 4.5 inches.
Stack height of laminated core 41 --- about 2 inches.
length of core section 42 --- about 1.5 inches.
Length of core section 43 --- about 3.06 inches.
Length of core section 45 --- about 3.06 inches.
Width of core section 44 --- about 0.7 inch.
Inductance of linear reactor $L_1$ --- about 20 ohms.
Inductance of current limiting reactor $L_2$ --- about 32 ohms.

With the improved core and winding arrangement in the exemplified core structure the voltage induced in any one of the windings when any other winding was energized was less than 4.5 percent of the turns ratio voltage. More specifically, when the winding $N_2$ was energized with 160 volts A.C., only 3.6 volts were measured across the winding $N_1$. When the winding $N_4$ was energized with 240 volts A.C., the measured value of induced voltages across the windings $N_2$ and $N_1$ was only approximately 6.3 volts and 2.1 volts, respectively.

During operation, the magnetic flux appearing in the path defined by the yoke 52 and outer legs 51 and 53 of core section 45 is sufficient to saturate at least the center leg 50 in that portion of the core. It should be noted that the cross sectional area of the magnetic path through core section 44 is essentially the same as the cross sectional area of the magnetic paths defined by the outer legs 51 and 53 of core section 45; and that essentially all of the saturable transformer flux passing through the outer legs 51 and 53 also passes through core section 44. Preferably the flux density, in lines per square inch, in core section 44 is less than the flux density in legs 51 and 53.

How this is accomplished can be best explained by having reference to FIGURE 1 and to the vector diagram of FIGURE 3 where:

$V_{IN}$=input voltage vector (voltage across leads 16, 18) with a phase angle of zero degrees;
$V_O$=magnetic voltage stabilizer output voltage vector (voltage across leads 18, 20);
$V_L$=lamp voltage vector (voltage across leads 30, 18);
$I_{IN}$=input current vector;
$I_L$=lamp current vector;
$\phi_{L1}$=flux vector produced in linear reactor $L_1$;
$\phi_{L2}$=flux vector produced in current limiting reactor $L_2$;
$\phi_{T1}$=flux vector produced in saturable transformer $T_1$;
$\phi_{T1}-\phi_{L2}$ represents the vector resulting from the vectorial subtraction of $\phi_{T1}$ and $\phi_{L2}$;
$\phi_{L1}-\phi_{L2}$ represents the vector resulting from the vectorial subtraction of $\phi_{L1}$ and $\phi_{L2}$;
$i_{IN}$=instantaneous input current;
$i_L$=instantaneous lamp current;
$\phi'_{L1}$=instantaneous flux in linear reactor $L_1$;
$\phi'_{L2}$=instantaneous flux in current limiting reactor $L_2$; and
$\phi'_{T1}$=instantaneous flux in saturable transformer $T_1$.

In FIGURE 1, when the polarity of the voltage supplied at lead 16 is positive with respect to lead 18, the input current $i_{IN}$ flows in the direction illustrated. The current flow through winding $N_1$ creates a magnetic field in winding leg 59. The direction of this field is indicated by arrows adjacent to flux symbol $\phi'_{L1}$. Further, the current flow through winding $N_4$ is from left to right. The current flow through winding $N_3$ is from right to left. The direction of the magnetic fields in winding legs 50 and 55 produced by this current is indicated by the arrows adjacent to the flux symbols $\phi'_{T1}$ and $\phi'_{L2}$.

The yoke section 58 provides a common path for the flux produced in the linear reactor $L_1$ and current limiting reactor $L_2$. Core section 44 provides a path for the flux produced in the current limiting reactor $L_2$ and saturable transformer $T_1$. As will be understood by those skilled in the art, the magnetic flux produced in linear reactor $L_1$ and current limiting reactor $L_2$ is vectorially subtractive in yoke section 58. In like manner, the magnetic flux present in core section 44 and in current limiting reactor $L_2$ and saturable transformer $T_1$ is vectorially subtractive.

From the vector diagram of FIGURE 3, it will be apparent that the magnitude of vector $\phi_{L1}-\phi_{L2}$ is less than the magnitude of a vector (not shown) representing the vectorial sum of vectors $\phi_{L1}$ and $\phi_{L2}$. Also, it will be apparent that the magnitude of $\phi_{T1}-\phi_{L2}$ is less than the magnitude of a vector (not shown) representing the vectorial sum of vectors $\phi_{T1}$ and $\phi_{L2}$. With the improved core and coil arrangement that results in these vectorial relationships, it is possible to provide a core and coil design utilizing relatively less core material, as compared with a core and coil arrangement that results in fluxes that are vectorially additive in the common core sections.

With the improved core and coil arrangement it was found that the relative phase relationship of the flux vectors could be maintained so that $\phi_{L1}-\phi_{L2}$ and $\phi_{T1}-\phi_{L2}$ is less than the corresponding vectorial sum of the vectors $\phi_{L1}$, $\phi_{T1}$ and $\phi_{L2}$ over a lamp voltage range of 85 to 160 volts. Thus the improved control apparatus performs effectively over an unusually wide range of lamp operating voltages.

In apparatus embodying the present invention with the saturating winding $N_4$ arranged in autotransformer relation and the windings $N_1$ and $N_4$ operating essentially independently of each other, it was found that the kilovolt ampere (kva.) rating may be 15 to 18 percent lower than the kva. rating for apparatus employing a current limiting reactor and a magnetic voltage stabilizer with isolated windings and magnetic shunts between the windings. In other words, the total kva. rating for a separate reactor and voltage stabilizer was found to be 17 to 21 percent more than the kva. rating of apparatus embodying the present invention which is capable of generally similar performance. As is well understood in the art, a lower kva. rating for apparatus indicates that for a given temperature rise, less winding material and/or less core material is needed in order to supply a given amount of power to a given load.

Turning again to the exemplification of FIGURE 1, the starting circuit 14 operates only when lamp 40 is not lighted and then only in every other half cycle of each cycle of applied voltage. Thus the starting circuit is active only during those intervals that essentially open circuit conditions exist across leads 30 and 18.

Assuming that an open circuit condition exists across leads 30 and 18, the starting circuit 14 operates in the half cycle when the polarity of the voltage applied at lead 16 is positive with respect to lead 18. When lead 16 begins to become positive with respect to lead 18, lead 22 which is connected to magnetic voltage stabilizer output lead 20 becomes positive with respect to leads 31 and 32. At this time the capacitor $C_4$ begins to charge through current limiting means that, in the exemplification, take the form of capacitor $C_3$. When capacitor $C_4$ reaches a peak charge of approximately 140 volts the switching means $SCR_1$ switches into a conducting mode and the capacitor $C_4$ is connected in a discharge path through leads 33 and 24, winding $N_3$, lead 26, and switching means $SCR_1$ to lead 31. The discharge of capacitor $C_4$ through winding $N_4$ causes a voltage to be induced in the winding $N_2$.

In the preferred embodiment, the switching means $SCR_1$ is illustrated as a silicon controlled rectifier. The silicon controlled rectifier $SCR_1$ is fired at a point in time to cause the starting pulses to be induced in the winding $N_2$ when an open circuit condition exists across the terminals 30 and 18, and lead 30 is positive with respect to lead 18.

At approximately the same time that the polarity of the voltage applied at lead 16 is becoming positive with respect to lead 18 a voltage appears across the voltage divider comprised of resistors $R_4$, $R_5$, $R_6$, $R_7$, $R_8$, and capacitor $C_5$. When an open circuit voltage condition exists across leads 30 and 18, the voltage at lead 35 is at a sufficient level to cause switching means $S_1$ to switch into conduction. Thereupon switch $S_1$ supplies a gating voltage in the early part of the half cycle of supply voltage through resistor $R_3$ and lead 34 to the gate of silicon controlled rectifier $SCR_1$ which switches into conduction. Under the described condition, capacitor $C_5$ acts as an energy tank to fire switch means $S_1$ which is shown as a voltage sensitive switch such as a neon discharge lamp. Resistor $R_3$ serves to limit the flow of current through both the switching means $S_1$ and the gate of silicon controlled rectifier $SCR_1$ and protects both of the switching devices from excessive current flow.

In alternate half cycles of applied voltage starting pulses do not appear across winding $N_3$ because the diodes $D_1$ and $D_2$ prevent a charge from building upon capacitors $C_4$ and $C_5$. Thus when lead 31 becomes positive with respect to leads 33 and 35 the diodes shunt charging current past the capacitors. The resistor $R_2$ is provided to desensitize the gate of silicon controlled rectifier $SCR_1$ and insure that silicon controlled rectifier $SCR_1$ will fire only when capacitor $C_5$ is discharged through neon switch $S_1$.

When the lamp 40 first begins to conduct the voltage across, the lamp drops to a very low value and a relatively large surge current is drawn through the winding $N_2$. This current surge could be sufficient to induce a voltage in winding $N_3$ and cause a current to flow in the loop composed of winding $N_3$, silicon controlled rectifier $SCR_1$, lead 31 resistor $R_1$, and diode $D_1$. This current flow in turn could be sufficiently great to destroy both diode $D_1$ and silicon controlled rectifier $SCR_1$. Therefore the resistance $R_1$ should be sufficiently large to limit the current to a safe level.

During starting conditions of the lamp 40 when silicon controlled rectifier $SCR_1$ conducts, a high voltage pulse appears on leads 30 and 18. The capacitor $C_5$ is used primarily as an energy storage device for firing silicon controlled rectifier $SCR_1$. However, as an added feature capacitor $C_5$ acts as a low impedance during the high voltage, high frequency pulse so that no damaging currents flow through neon discharge lamp $S_1$ and the gate of silicon controlled rectifier $SCR_1$.

After lamp 40 begins normal operation, sufficient voltage does not appear across resistance $R_8$ in the voltage divider network to fire neon discharge lamp $S_1$. During the starting condition of the lamp the diodes $D_1$ and $D_2$ serve to prevent capacitors $C_4$ and $C_5$ from attaining a charge during alternate half cycles of applied voltage. These diodes also insure that capacitors $C_4$ and $C_5$ begin to charge at approximately the same time in the proper half of each cycle of applied voltage. During normal operation, after the lamp 40 has lighted, diodes $D_1$ and $D_2$ discharge capacitors $C_4$ and $C_5$ during atlernate half cycles of applied voltage and prevent charge build up on the capacitors during operation.

The actual value of components used in the embodiment of the starting circuit illustrated in FIGURE 1 are given below in Table I.

TABLE I

Components—
Capacitors: Specifications $C_1$ and $C_2$ .................. 35 microfarads, 280 volts AC.

$C_3$ .................. .33 microfarad, 400 volts DC.

$C_4$ .................. 1.0 microfarad, 400 volts DC.

$C_5$ .................. .033 microfarad, 200 volts DC.

Resistors:
$R_1$ .................. 27 ohms.
$R_2$ and $R_3$ .................. 1K ohm.
$R_4$, $R_5$, $R_6$ and $R_7$ .................. 33K ohms.
$R_8$ .................. 82K ohms.

Diodes:
$D_1$ and $D_2$ .................. General Electric A13B2 diode.

Switches:
$S_1$ .................. General Electric 5AH neon lamp.

$SCR_1$ .................. General Electric C106B1 silicon controlled rectifier.

The new and improved starting circuit of the present invention has proven to be extremely reliable in life tests and is relatively inexpensive to manufacture. Further, the starting circuit of the present exemplification is capable of supplying satisfactory starting pulses to lamps which are positioned more than 35 feet away from the control apparatus. This capability of the starting circuit is illustrated in FIGURE 4.

FIGURE 4 shows a plot of the percent of maximum peak voltage available from a starting circuit versus the length of conductor between the starting circuit and a lamp. In FIGURE 4, the horizontal dashed line corresponding to approximately 78 percent represents the minimum voltage generally needed for starting the high-intensity sodium lamps. This "limit" is based upon the availability of 3,200 volts from the starting circuit when it is not separated from the lamp. Curve B of FIGURE 4 was plotted from data obtained by testing a control apparatus wherein the lamp was operated with a phase controlled circuit. Curve A represents a plot of corresponding data for the apparatus of FIGURE 1. It will be seen from Curve B that control apparatus corresponding to curve B provided adequate starting voltage only when conductors of 12 feet or less were used. However, control apparatus according to the embodiment of FIGURE 1 supplied adequate starting voltages to the high-intenstiy sodium lamp when lengths of conductor were used that exceeded 35 feet.

FIGURE 5 illustrates the characteristics of a prior art control device and apparatus embodying the present invention when used to regulate high-intensity sodium lamps. Curve C is a plot of lamp watts versus lamp volts when a high-intensity sodium lamp is operated with the control apparatus of FIGURE 1 (nominal line voltage of 120 volts). Curve D represents a similar plot corresponding to operation of a high-intensity sodium lamp with control apparatus supplying a phase controlled current for operating the lamp (nominal line voltage of 240 volts).

It is a specification of the manufacturer of a nominal 400 watt size of high-intensity sodium lamps that in order to maintain satisfactory lumen output and stable lamp operation, between 330 watts and 440 watts should be supplied to the lamps when the lamp voltage varies from 85 to 160 volts. It can be seen from curve C of FIGURE 5 that control apparatus embodying the present invention will operate these lamps within the specified wattage limits over the full specified range of lamp volts. However, the apparatus typified by curve D is not able to maintain satisfactory lamp operation at voltages greater than about 147 volts.

From the foregoing description it will be seen that we have provided improved starting and operating control apparatus for arc discharge devices, particularly high-intensity sodium lamps, in which the power supplied to the lamp is maintained within desired limits over the life of the lamp. It will also now be apparent that the improved apparatus provides flexibility in the selection of starting circuits, makes use of components in the starting circuit only when needed for initiating operation of the lamps, can be designed with a reactive device having a relatively lower kva. rating, and is less costly to manufacture.

While there has been illustrated and described a specific embodiment of this invention, further modifications and improvements will occur to those skilled in the art and it is to be understood therefore, that this invention is not limited to the specific form shown and it is intended that the appended claims cover all modifications which do not depart from the spirit and scope of this invention.

What we claim as new and desire to secured by Letters Patent of the United States is:

1. Apparatus for starting and operating at least one gaseous discharge lamp from a source of alternating current comprising a pair of input terminals for connection to said source and a pair of output terminals adapted to connect said lamp in a lamp operating circuit loop, means for providing a stabilized operating circuit voltage, means for limiting the operating circuit current, said means for providing a stabilized operating circuit voltage and said means for limiting the operating circuit current connected in the lamp operating circuit loop between the input and output terminals, and means including voltage dividing means responsive to the open circuit voltage condition at the output terminals for superimposing a starting voltage on the operating circuit voltage.

2. The apparatus of claim 1 wherein said means for superimposing a starting voltage on the operating circuit voltage further comprises a starting winding magnetically coupled in said lamp operating circuit loop, a capacitor, and switching means for discharging said capacitor through said starting winding, and said voltage dividing means includes resistance means connected in circuit with said output terminals for activating said switching means when an open circuit voltage condition exists at said output terminals.

3. In an apparatus including means for limiting the operating current supplied to an electric discharge lamp from a power source, said current limiting means having a winding, the improvement comprising: a magnetic voltage stabilizer connected in circuit with the current limiting means for supplying a stabilized voltage to the current limiting means and to the electric discharge lamp, said magnetic voltage stabilizer including a saturable transformer winding, a core structure forming a first magnetic circuit for flux associated with the winding of said current limiting means and a second magnetic circuit for flux associated with said saturable transformer winding, said second magnetic circuit including a first leg with a predetermined cross sectional area and a second leg with a cross sectional area not greater than said predetermined cross sectional area, said first leg saturating during operation with the flux produced in said saturable transformer winding, said second leg forming a common portion of said first and second magnetic circuits, and said winding of the current limiting means and said saturable transformer winding being loosely coupled on said core structure and cooperating to produce a flux in said second leg during operation that is insufficient to saturate said second leg.

4. An apparatus for starting and operating an electric discharge device from a power source comprising: means for supplying operating current and a stabilized operating voltage, means for limiting the operating current, and means for superimposing a high voltage starting pulse on the operating voltage, said means for supplying a stabilized operating voltage including a saturable transformer comprised of a winding on a laminated core with said laminated core forming a first path for the flux associated with the saturable transformer winding, at least a portion of said first path having a predetermined cross sectional area that is saturated during operation by the magnetic flux associated with said saturable transformer winding, said means for limiting the operating current including a winding loosely coupled with said saturable transformer winding and wound on said laminated core, said laminated core forming a second path for the magnetic flux associated with the winding of the current limiting means, said laminated core having a common core portion where the flux paths merge, said common core portion having a cross sectional area not greater than said predetermined cross sectional area, and said windings being disposed relative to each other on the laminated core to conjointly produce a flux in said common core portion that is insufficient to saturate said common portion.

5. The apparatus of claim 4 wherein said means for superimposing a high voltage starting pulse on the operating voltage includes a winding closely coupled on the laminated core with the winding of said means for limiting the operating current.

6. An apparatus for operating an electric discharge lamp with an alternating potential comprising: a magnetic voltage stabilizer including a saturable reactor winding, current limiting means including a winding, and a laminated core assembly for the saturable reactor winding and the winding of the current limiting means, said laminated core defining a magnetic circuit for the magnetic flux developed by the saturable reactor winding and a magnetic circuit for the flux developed by the winding of the current limiting means, said laminated core including a non-saturating yoke section common to both magnetic circuits, said windings being disposed on said laminated core so that a resultant magnetic flux is produced in said yoke section having a magnitude less than the magnitude of the magnetic flux associated with the saturable reactor winding.

7. Apparatus for starting and operating an electric discharge lamp from a source supplying a potential in alternating cycles, said lamp during operation conducting in each half of said alternating cycles, said apparatus comprising: input means for connection to said source and output means including connections for supplying a starting and operating voltage to said lamp, a magnetic voltage stabilizer for providing a stabilized operating voltage, said magnetic voltage stabilizer including a linear reactor, a saturable autotransformer and a capactor, a current limiting reactor for limiting the current supplied to the lamp, circuit means for connecting said magnetic voltage stabilizer and said current limiting reactor between the input and output means in a lamp operating loop, means for superimposing a saturating voltage on said operating voltage including a winding closely coupled magnetically with said current limiting reactor, a capacitor for supplying a starting voltage pulse, switching means for discharging said capacitor through said winding, and voltage divider means connected to said output means responsive to the open circuit voltage condition at said output means and connected in circuit with said switching means whereby a voltage is supplied to said switching means and said capacitor is discharged through said winding to provide said starting voltage.

8. Apparatus for starting and operating an electric discharge lamp from a source supplying a potential in alternating cycles, said lamp during operation conducting in each half of said alternating cycles, said apparatus comprising: input means for connection to said source and output means including connections for supplying a starting and operating voltage to said lamp, a magnetic voltage stabilizer for providing a stabilized operating voltage, means for limiting operating current, circuit means for connecting said mangetic voltage stabilizer and said means for limiting operating current between the input and output means in a lamp operating loop, and means responsive to the open circuit voltage condition at said output means for superimposing a starting voltage on the operating voltage during alternate half cycles of said alternating cycles to supply a starting voltage for said lamp.

9. The apparatus of claim 8 wherein said means for limiting the operating current includes a winding and said means for superimposing a starting voltage on the operating voltage comprises a starting winding magnetically coupled with the winding of the means for limiting the operating circuit current and starting circuit including a capacitor and semiconductor switching means for discharging said capacitor through said starting winding to induce said starting voltage in said lamp operating loop.

10. The apparatus of claim 9 wherein said starting circuit further includes voltage dividing means connected across said output means, said voltage dividing means supplying a switching voltage to said semiconductor switching means in said alternate half cycles to discharge said capacitor when an open circuit voltage condition exists at said output means.

11. In an apparatus for starting and operating an electric discharge lamp from a power source including means for supplying a stabilized operating voltage, a current limiting reactor, and output means, the improvement comprising: means for superimposing a starting voltage on said operating voltage including a winding closely coupled magnetically with said current limiting reactor, a capacitor for supplying a starting voltage pulse, semiconductor switching means for discharging said capacitor through said winding, and means responsive to the open circuit voltage condition at said output means for causing said semiconductor switching means to discharge said capacitor through said winding to provide said starting voltage, said means responsive to the open circuit condition at said output means including a voltage divider means connected across said output means.

References Cited
UNITED STATES PATENTS

| | | | |
|---|---|---|---|
| 2,212,198 | 8/1940 | Sola | 323—50 |
| 2,825,024 | 2/1958 | Berghoff | 232—61 |
| 2,869,069 | 1/1959 | Wright | 323—66 |
| 3,027,490 | 3/1962 | Craig | 315—144 |
| 3,058,033 | 10/1962 | Halloy et al. | 315—289 |
| 3,076,924 | 2/1963 | Manteuffel | 323—22 |
| 3,155,894 | 1/1964 | Bell | 323—66 |
| 3,246,201 | 4/1966 | Michalski | 315—120 |
| 3,259,796 | 7/1966 | Hallay | 315—174 |
| 3,263,125 | 7/1966 | Genuit | 315—219 |
| 3,309,567 | 4/1967 | Flieder et al. | 315—176 |

JAMES W. LAWRENCE, *Primary Examiner.*

C. R. CAMPBELL, *Assistant Examiner.*